(12) United States Patent
Knapp et al.

(10) Patent No.: US 6,762,910 B1
(45) Date of Patent: Jul. 13, 2004

(54) DATA STORAGE AND RETRIEVAL APPARATUS WITH THIN FILM READ HEAD HAVING INSET EXTRA GAP INSULATION LAYER AND METHOD OF FABRICATION

(75) Inventors: Kenneth E. Knapp, Livermore, CA (US); Zi-Wen Dong, Fremont, CA (US); Ronald A. Barr, Mountain View, CA (US); Russel Stearns, Stockton, CA (US); Bill Crue, Pittsburgh, PA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 09/325,104

(22) Filed: Jun. 3, 1999

(51) Int. Cl.$^7$ .................................................. G11B 5/31
(52) U.S. Cl. ...................................................... 360/126
(58) Field of Search .................................. 360/319, 320, 360/110, 313, 314, 321, 322, 119, 120, 121, 126, 318, 317; 29/603.13, 603.14; 428/692

(56) References Cited

U.S. PATENT DOCUMENTS

| | | | |
|---|---|---|---|
| 4,742,412 A | 5/1988 | Kuriyama | 360/119 |
| 4,807,073 A | 2/1989 | Takeura et al. | |
| 5,111,352 A | 5/1992 | Das et al. | |
| 5,208,715 A | 5/1993 | Mowry | |
| 5,212,609 A | 5/1993 | Yuito et al. | |
| 5,212,611 A | 5/1993 | Dee | |
| 5,264,980 A | 11/1993 | Mowry et al. | |
| 5,274,520 A | 12/1993 | Matsuzono et al. | |
| 5,274,521 A | 12/1993 | Miyauchi et al. | 360/119 |

(List continued on next page.)

FOREIGN PATENT DOCUMENTS

| | | | |
|---|---|---|---|
| JP | 61258322 A | * | 11/1986 |
| JP | 7-29123 | * | 1/1995 |
| JP | 9-106512 | * | 4/1997 |
| JP | 10-162321 | * | 6/1998 |
| JP | 11-25431 | * | 1/1999 |
| JP | 11-25431 A | * | 1/1999 |
| JP | 11-175924 | * | 7/1999 |
| JP | 11-273032 | * | 10/1999 |
| JP | 2000-182223 | * | 6/2000 |
| JP | 2000-348316 | * | 12/2000 |
| JP | 2001-34918 A | * | 2/2001 |

Primary Examiner—Tianjie Chen
(74) Attorney, Agent, or Firm—Carr & Ferrell LLP

(57) ABSTRACT

The present invention provides a thin film read head having a lower shield pedestal with an adjacent lower extra gap layer. The pedestal may be formed from a lower shield layer with the lower extra gap layer being inset within the lower shield layer so that the top surfaces of the lower extra gap layer and the pedestal are generally planar. This allows for deposition of generally planar lower gap and sensor layers. A sensor element may be defined on the generally planar surface using a bilayer resist structure. The generally planar surface of the sensor layer inhibits resist pooling which could otherwise degrade resist structure and sensor element formation. In a typical embodiment, the read head of the present invention may have a spin valve type sensor element with leads electrically coupled to the sensor element, an upper gap layer extending between the sensor element and the upper shield layer, and an upper extra gap layer disposed between at least a portion of the leads and the upper shield layer. Furthermore, the read head typically is embodied in a data storage and retrieval apparatus having a merged read/write head assembly. Reducing surface topography allows for better control of resist deposition and patterning. As such, smaller, more robust resist structures may be formed on the sensor layer to define a smaller track width sensor element.

This allows manufacture of reduced track width devices while providing extra gap material for protection from lower shield-to-lead shorting.

30 Claims, 5 Drawing Sheets

U.S. PATENT DOCUMENTS

| | | | |
|---|---|---|---|
| 5,331,493 A | 7/1994 | Schwarz | |
| 5,363,265 A | 11/1994 | Hsie et al. | |
| 5,546,254 A | 8/1996 | Gill | |
| 5,563,752 A | 10/1996 | Komuro et al. | |
| 5,568,335 A | 10/1996 | Fontana et al. | |
| 5,633,771 A | 5/1997 | Yoda et al. | 360/129 |
| 5,644,455 A | 7/1997 | Schultz | |
| 5,652,687 A | 7/1997 | Chen et al. | 360/126 |
| 5,653,013 A | 8/1997 | Gill et al. | 29/603.14 |
| 5,696,656 A * | 12/1997 | Gill et al. | 360/319 |
| 5,700,380 A | 12/1997 | Krounbi et al. | 216/22 |
| 5,707,538 A | 1/1998 | Shen et al. | 216/22 |
| 5,734,533 A | 3/1998 | Nepela | 360/119 |
| 5,764,447 A | 6/1998 | Lazzari | |
| 5,764,448 A | 6/1998 | Lazzari et al. | |
| 5,774,308 A | 6/1998 | Ohtsuka et al. | 360/126 |
| 5,777,542 A | 7/1998 | Ohsawa et al. | 338/32 |
| 5,779,923 A | 7/1998 | Krounbi et al. | |
| 5,809,636 A * | 9/1998 | Shouji et al. | 29/603.14 |
| 5,838,521 A * | 11/1998 | Ravipati | 360/319 |
| 5,867,350 A * | 2/1999 | Haga et al. | 360/319 |
| 5,914,838 A * | 6/1999 | Ruigrok et al. | 360/320 |
| 5,966,274 A * | 10/1999 | Suzuki | 360/317 |
| 6,010,745 A * | 1/2000 | Sato et al. | 428/128 |
| 6,025,977 A * | 2/2000 | Hu et al. | 360/319 |
| 6,034,848 A * | 3/2000 | Garfunkel et al. | 360/126 |
| 6,043,959 A * | 3/2000 | Crue et al. | 360/317 |
| 6,125,009 A * | 9/2000 | Ishiwata et al. | 360/317 |
| 6,167,021 A * | 12/2000 | Yoshida et al. | 369/275.2 |
| 6,177,207 B1 * | 1/2001 | Koike | 428/692 |
| 6,198,609 B1 * | 3/2001 | Barr et al. | 360/322 |
| 6,252,749 B1 * | 6/2001 | Hayakawa | 360/320 |
| 6,392,851 B1 * | 5/2002 | Ishiwata et al. | 360/317 |

* cited by examiner

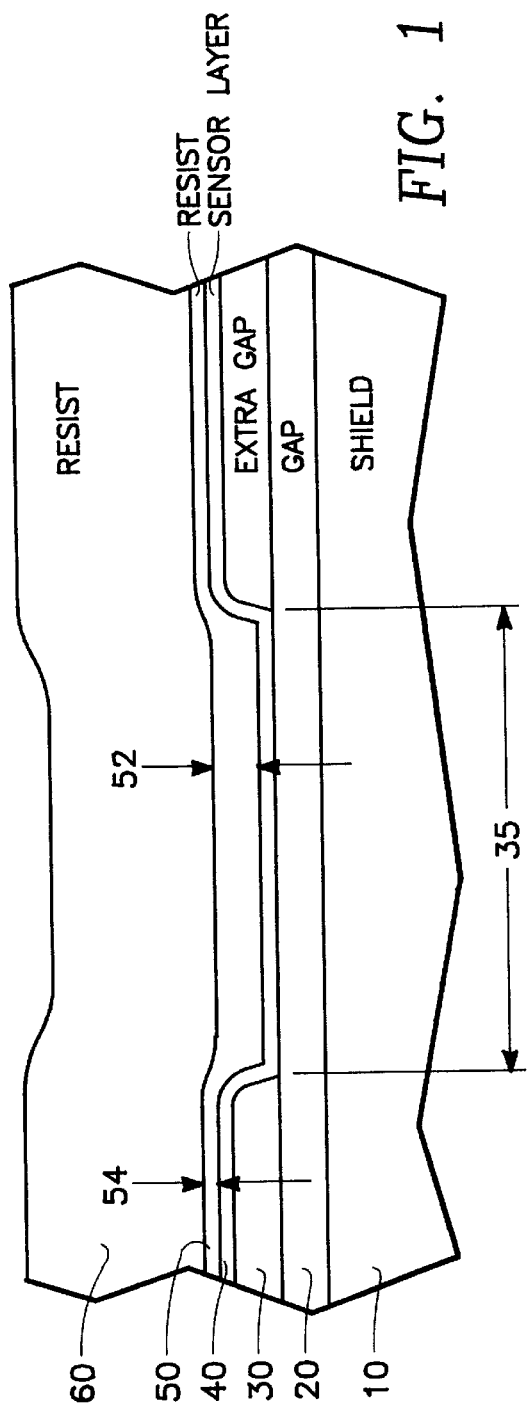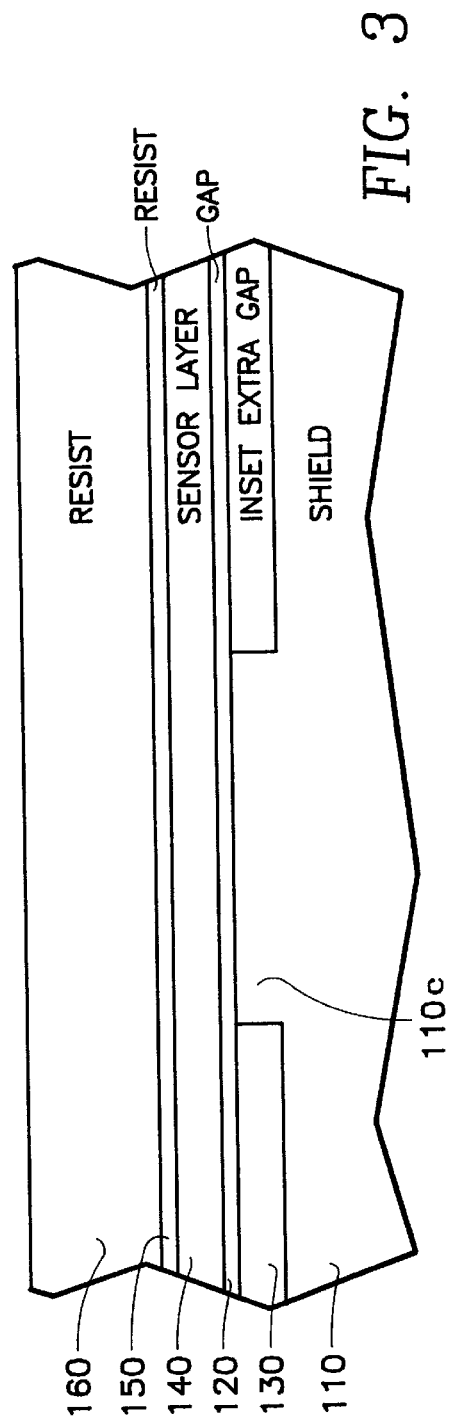

DATA STORAGE AND RETRIEVAL APPARATUS WITH THIN FILM READ HEAD HAVING INSET EXTRA GAP INSULATION LAYER AND METHOD OF FABRICATION

BACKGROUND OF THE INVENTION

Typical thin film read heads are located between shields. The shields improve head performance by shielding stray magnetic flux from the sensor element. Gap layers electrically insulate the shields from the sensor element and from abutting lead structures.

As read head structures become smaller to improve aerial density, it is desirable to reduce the thickness of the insulative gap layers to optimize head sensitivity. Although reducing the thickness of the gap layers improves sensitivity by reducing the distance between the sensor and the shield, it also allows lead structures deposited lateral to the sensor element to more easily short to the shields.

Because shield-to-shield spacing is not as critical away from the sensor element, it is not necessary to have thin gaps away from the sensor element. As such, extra gap layers typically are deposited over the gap layers-away from the sensor element to increase gap thickness away from the sensor element. This reduces shorting between the lead structures and the shields.

An example of such structure is disclosed in U.S. Pat. No. 5,568,335, by Fontana, et al., issued Oct. 22, 1996, entitled MULTI-LAYER GAP STRUCTURE FOR HIGH RESOLUTION MAGNETORESISTIVE READ HEAD, herein incorporated by reference in its entirety. In such a read head, the extra gap layer is deposited over the gap layer lateral to and away from the sensor element. Although this reduces shorting between the leads and shields, the present inventors have found such structures difficult to reliably manufacture with submicron track widths. Sub-micron track width is necessary for high track density applications greater than about 15 Kilo tracks per inch and aerial densities greater than about 7 Giga bits per square inch. Such a structure, therefore, while improving reliability of the read head, proves an impediment to high aerial density.

SUMMARY OF THE INVENTION

The present invention provides a thin film read head having an extra gap layer inset in the lower shield layer. In a preferred embodiment, a pedestal is formed from a lower shield layer, such as by ion milling the lower shield layer. With this embodiment, the lower extra gap layer is formed adjacent the pedestal so that the top surfaces of the extra gap layer and the pedestal are at approximately the same level. This allows for deposition of generally planar lower gap and sensor layers over the lower extra gap layer, reducing surface topography, thus improving control of resist deposition and patterning.

With the preferred method, a sensor element is defined from the generally planar sensor layer, using a bilayer resist structure. The generally planar surface inhibits resist pooling, which could otherwise degrade resist structure formation, and allows for more uniform resist deposition. As such, smaller, more robust resist structures may be formed on the sensor layer to define a smaller track width sensor element. This allows manufacture of reduced track width devices while providing extra gap material for protection from lower shield-to-lead shorting.

In a typical embodiment, the thin film read head of the present invention may have a spin valve type sensor element with leads electrically coupled to the sensor element, an upper gap layer extending between the sensor element and the upper shield layer, and an upper extra gap layer disposed between at least a portion of the leads and the upper shield layer. Furthermore, the thin film read head typically is embodied in a data storage and retrieval apparatus having a merged read/write head assembly.

BRIEF SUMMARY OF THE DRAWINGS

FIG. 1 is a view from the air bearing surface of a partially fabricated read head illustrating experimental observations by the present inventors of an embodiment without an inset extra gap of the preferred embodiment.

FIG. 3 is a view from the air bearing surface of a partially fabricated read head in accordance with the present invention.

DETAILED DESCRIPTION OF THE PREFERRED EMBODIMENTS OF THE INVENTION

Figure 2:
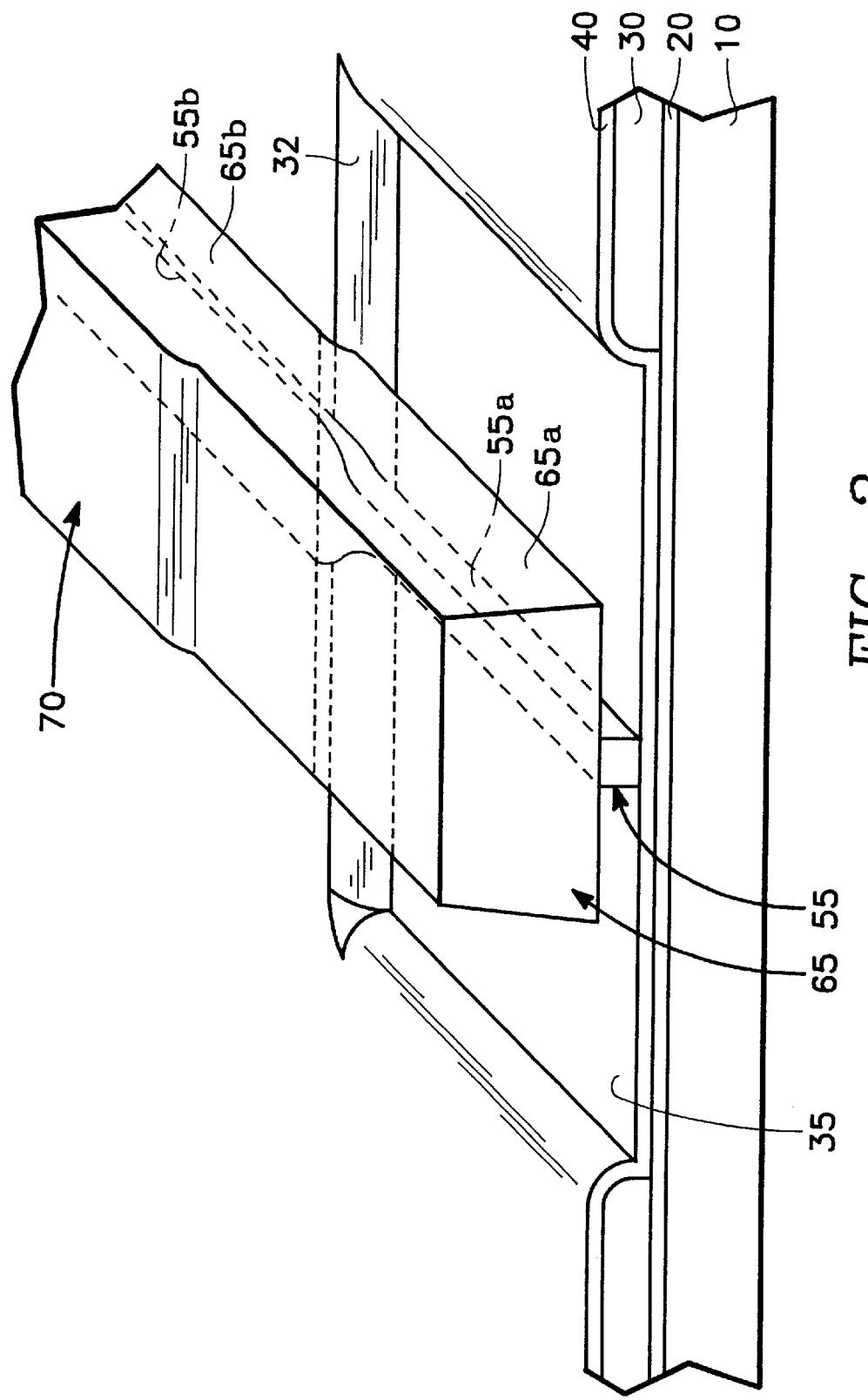
FIG. 2 is an isometric view from the air bearing surface of a partially fabricated read head illustrating experimental observations by the present inventors of an embodiment without an inset extra gap of the preferred embodiment.
Figure 4:
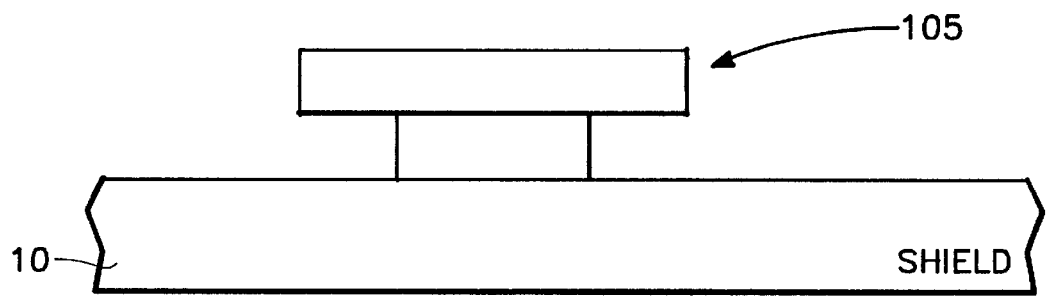
FIGS. 4–6 are views from the air bearing surface of a partially fabricated read head depicting formation of an inset extra gap layer in accordance with the present invention.

FIG. 1, shows an air bearing surface view of a partially fabricated read device. A first read gap layer 20 is formed on a lower shield 10. An extra read gap layer 30 is formed by masking and deposition on the first read gap layer 20 to provide extra insulation lateral to a sensor element (not shown) ultimately formed in a trench 35 defined by the extra read gap layer 30. A layer or layers of sensor material 40 are formed on the extra read gap layer 30 and on the exposed first read gap layer 20 in the trench 35. The first read gap layer 20 typically is formed thin to reduce the distance between the shield 10 and the sensor layer 40 within the trench 35 where the sensor element is formed. Lower and upper photoresist layers 50 & 60 are deposited over the sensor layer in preparation for defining a bilayer reentrant photoresist structure (shown in FIG. 2) which defines the sensor element.

Although the extra gap layer 30 inhibits shorting between the lower shield layer 10 and lead material (not shown), it has been observed by the present inventors to create particular difficulty when fabricating sub-micron track width sensor elements. This primarily is due to difficulties forming the resist structure used to pattern the sensor element.

FIG. 2 illustrates the problems associated with forming small resist structures as observed by the present inventors. FIG. 2 is an isometric view of a partially fabricated read head as seen from the air bearing surface. The bilayer resist structure 70 is formed by masking, exposing, and removing portions of the photoresist layers 50 & 60 to form portions 55 and 65 used to define the sensor element. It should be noted, in typical applications, the sensor element extends back from the air bearing surface and onto the extra gap layer behind a back wall 32 of the trench 35 distal from the air bearing surface of the device.

Referring to FIGS. 1 & 2, as track widths get smaller and smaller, the photoresist patterns can no longer survive running over the step created by back wall 32. The photoresist structure 70 used to define a narrow sensor element is itself very narrow. As the resist structure 70 runs over the step created by back wall 32, it can pinch off and become discontinuous. This effect is particularly pronounced with the bilayer resist structure 70, but can also occur with other types of resist structures and lithographic techniques, such as single layer resist, negative resist, trilayer resist, silated, or others.

In addition, as photoresist thickness is reduced to provide small structures, it is very difficult to adjust photoresist thickness within the trench. Typically, photoresist thickness is controlled by spinning the workpiece to reduce the thickness of the photoresist. As trench width and photoresist thickness is reduced, however, surface tension tends to hold a pool of photoresist within the trench so that it is resistive to thickness change. This effect makes it difficult to control photoresist uniformity across the workpiece and to control thickness of any small photoresist structure formed within the trench.

In the case of the bilayer resist structure 70 depicted in FIG. 2, the photoresist layer 50, which is typically PMGI manufactured by Shipley of Massachusetts, or the like, forms thicker in the trench 35 and thinner on the extra gap layer 30. This is also depicted in FIG. 1 by reference numbers 52 & 54. As a result, since the lateral etch rate of the PMGI increases with thickness, a greater portion of resist layer 50 is removed within the trench 35 than on the extra gap layer 40, as depicted by 55a & 55b in FIG. 2. The lower portion of the resist structure 55a in the trench or well is formed narrower than lower portion of the resist structure 55b beyond the back wall 32 of the trench. This can cause within the trench 35, a the collapse of the upper resist layer 65 of the photoresist structure 70, or depending on sensor layer etch technique, it could define a sensor element having a non-uniform width as it extends from the air bearing surface.

Furthermore, small changes in resist thickness can cause reflections and pattern focusing problems during exposure, even with conventional photoresist processes. As such, this type topographical structure causes problems with any photo lithographic processes that utilizes spin coating of resist. This is particularly true at smaller geometries where tolerances are reduced.

FIGS. 3–6 show an air bearing surface view of partial fabrication of a thin film read head in accordance with a preferred embodiment of the present invention. With this embodiment, a portion of shield layer 10 is removed using a resist structure 105 to define a pedestal 110c extending from shield layer 110. An extra gap layer 130 is deposited on the lower shield layer 110 so that it is inset within the shield layer 110. This reduces the height of the walls forming the trench or well 35 so reduces the amount of resist 50 able to pool within the well. As such, the thickness of the resist 50 in the area where the sensor element will be formed may be controlled by reducing the depth of the trench.

With the preferred method, the amount of shield material removed and the amount of inset extra gap layer 130 deposited is approximately equal so that the top of the inset extra gap layer 130 approximately is the same height as the pedestal portion 110c of the shield layer 110. Thus, in this embodiment, the extra gap layer 130 is deposited adjacent the side walls of the pedestal so that the top of the inset extra gap layer 130 is approximate level with and abutting the top of the pedestal portion 110c of the shield layer 110. For example, with the preferred embodiment, approximately 500 to 5000 Angstroms of NiFe shield material is etched and approximately 500 to 5000 Angstroms of $Al_2O_3$ extra gap material is deposited.

Figure 5:
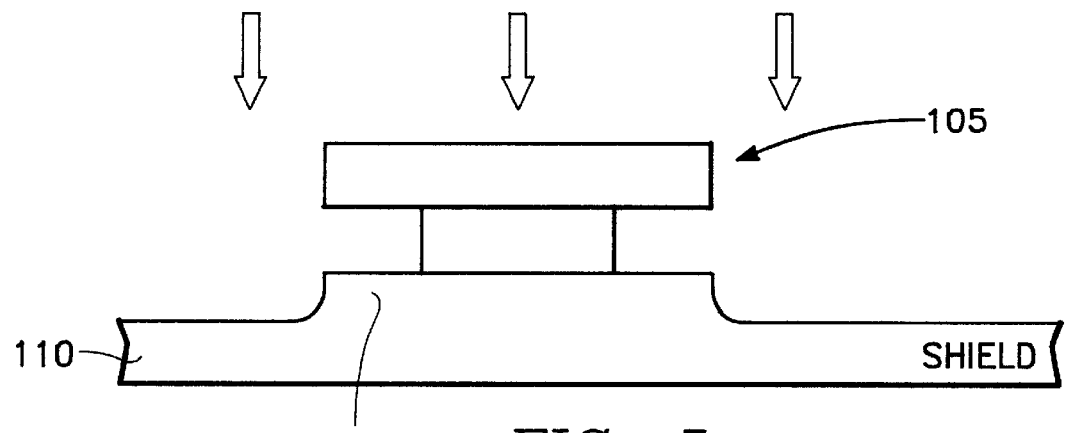
Figure 6:
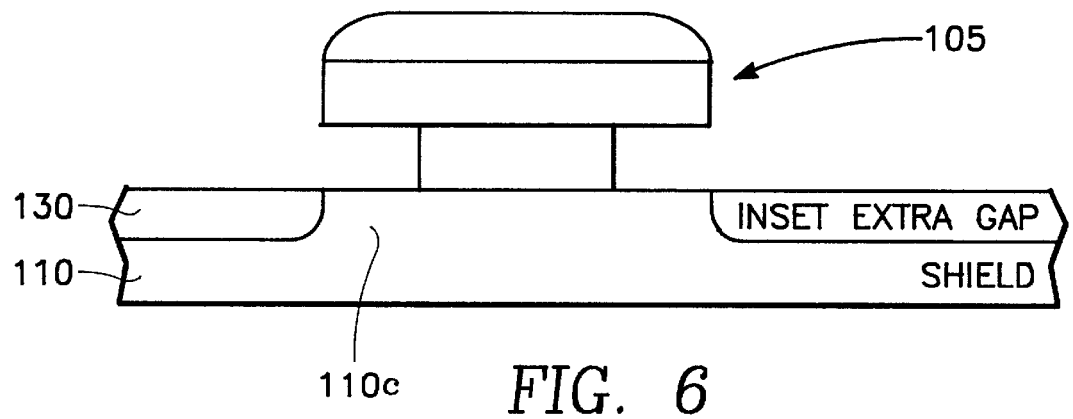

Although other well known resist patterning techniques may be used, with the preferred method, a bilayer resist structure 105 having a reentrant profile is formed on the shield layer 10, as is well known in the art. The shield layer 10 is then ion milled as depicted in FIG. 5, in preparation for inset extra gap layer 130. With the preferred method, extra gap material is deposited over the now etched portion of the shield layer 110 and the resist structure 105. The resist structure 105 and overlying material is then removed with a lift off process as is well known in the art. Although such an etch and deposition process forms a generally planar surface without planarization, with some embodiments it may be desirable to planarize the surface, such as by chemical mechanical polish, following resist structure lift off. In addition, although a 90 degree milling angle with respect to the workpiece surface is depicted for example purposes, any appropriate milling angle may be selected depending on the shield material etch characteristics and corresponding extra gap material deposition characteristics.

Figure 7:
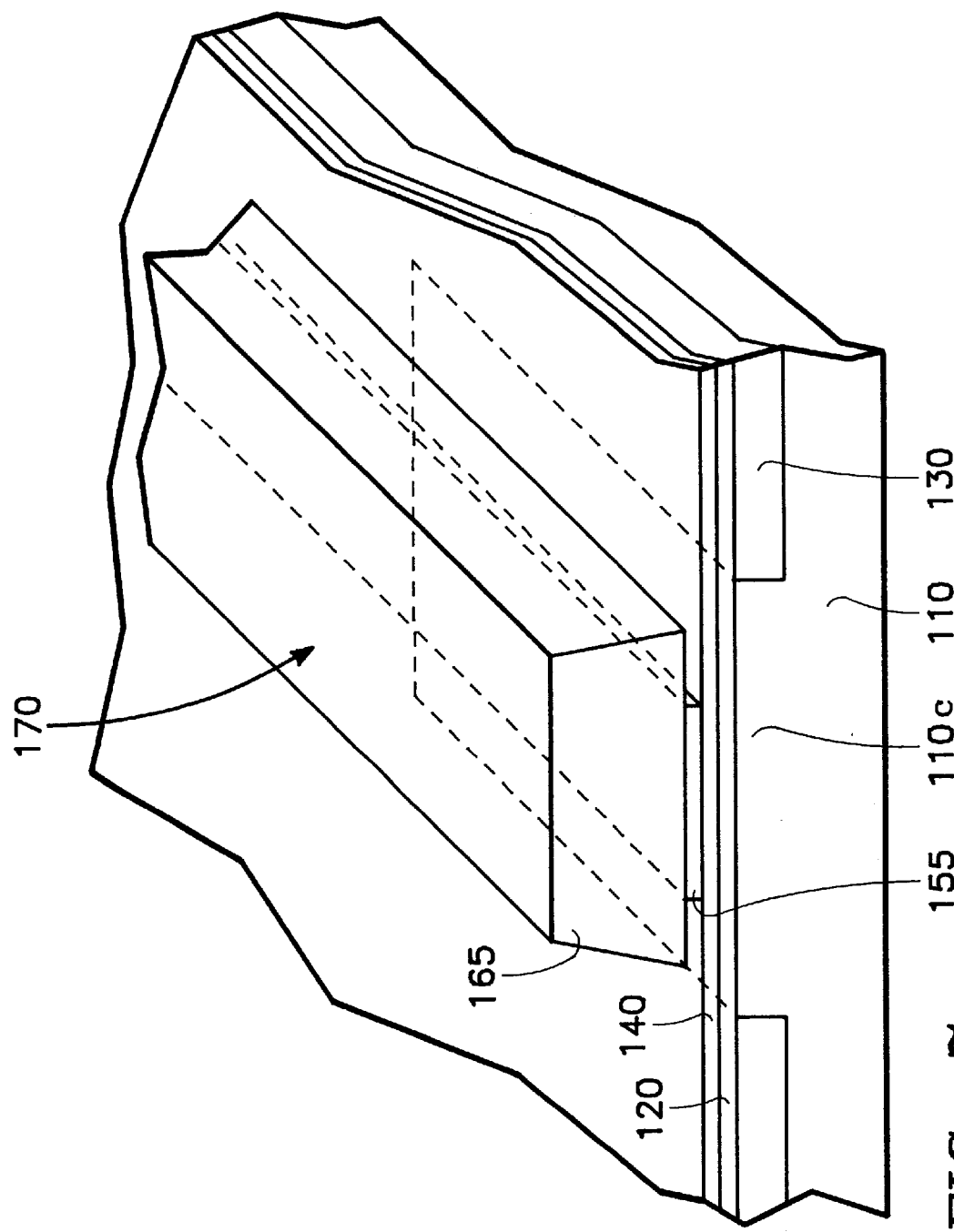
FIG. 7 is an isometric view from the air bearing surface of a partially fabricated read head in accordance with the present invention.

FIG. 7 shows an isometric view of a partially fabricated read head in accordance with the present invention. Because the gap layer 120 and sensor layer 140 are deposited over the generally planar surface formed by the pedestal 110c and the inset extra gap layer 130, the bilayer resist structure 170 formed on the sensor layer 140 extends uniformly back from the air bearing surface over the pedestal 100c and lower extra gap layer 130. Not only does this allow better control of the formation of the lower portion 155 of the resist structure, the reduction of surface topography near the resist structure also allows the critical dimension of the sensor element, defined in the preferred method by the width of the upper portion 165 of the resist structure 170, to more accurately be formed during the lithographic process. As such, the preferred embodiment inhibits resist discontinuity, resist collapse, and sensor non-uniformities which could otherwise result from the extra gap step of FIGS. 1 & 2. Further, it also allows precise formation of reduced size read head devices. By way of non-exclusive example, spin valve type sensor elements may be commercially manufactured having well defined track widths below 1 micron, and even below 0.3 microns, without photoresist pealing or collapse.

Figure 8:
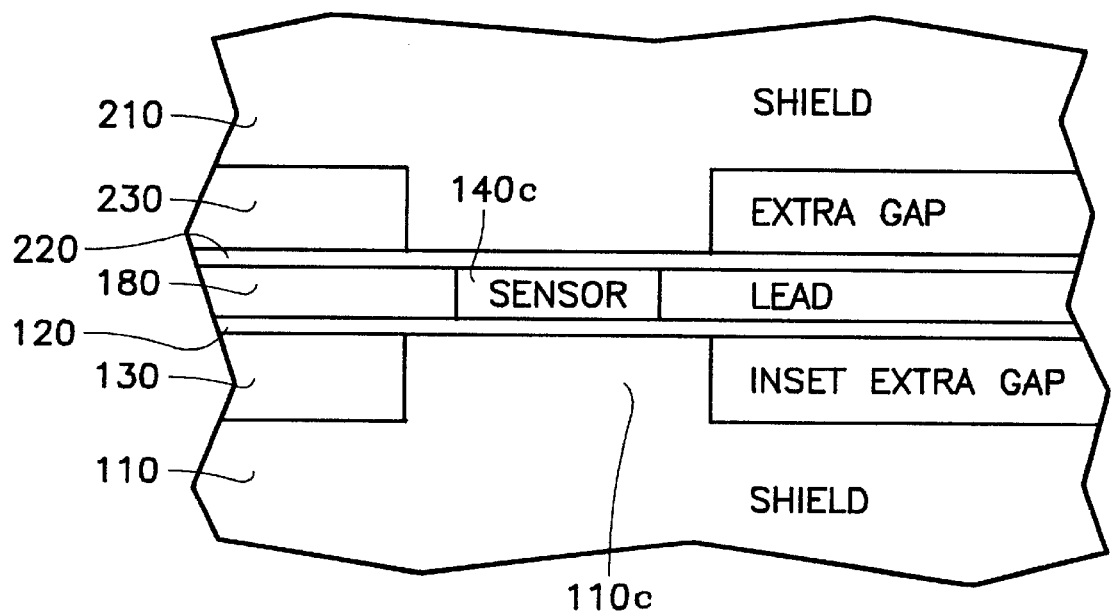
FIG. 8 is a view from the air bearing surface of a read head in accordance with the present invention.

FIG. 8 depicts an air bearing surface view of a typical read head in accordance with the present invention. Leads 180 are electrically coupled to the sensor element 140c to provide sensing current and detection. An upper shield layer 210 is typically deposited over an upper gap layer 220 and upper extra gap layer 230. The upper extra gap layer 230 reduces shorting between the upper shield 210 and the lead 180.

Other embodiments and methods of fabricating read sensors also may benefit from the planar extra gap of the preferred embodiment, such as an inverted hard bias device—one where the hard bias if fabricated first with the spin valve deposited on top, spin tunneling devices, anisotropic magneto resistive devices, or other shielded read sensor devices.

Figure 9:
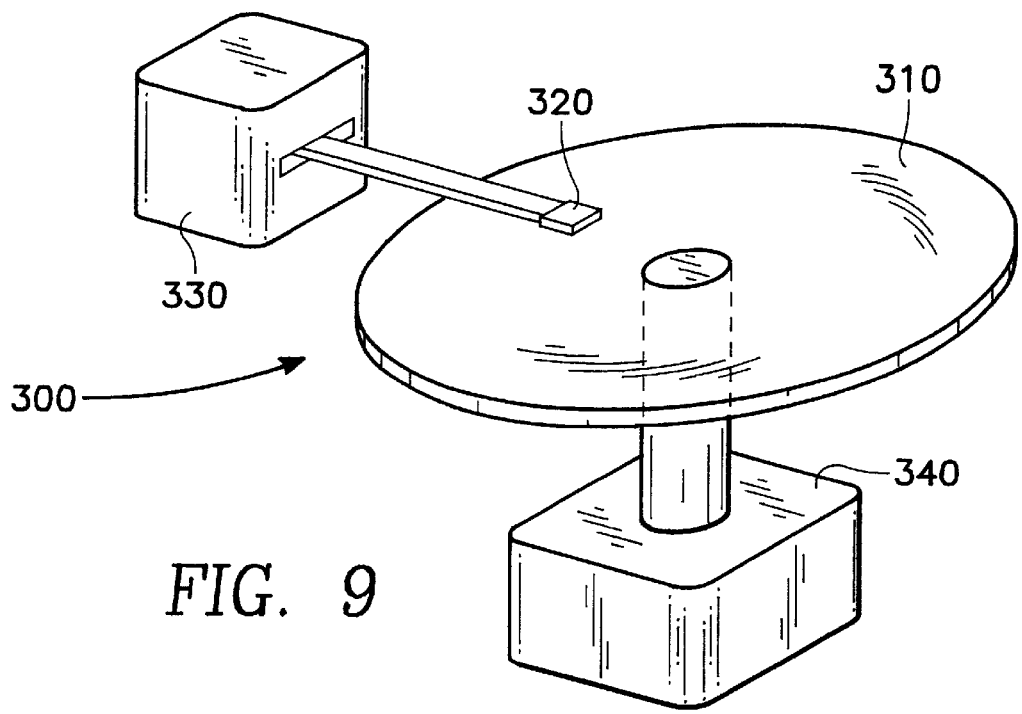
FIG. 9 is an isometric view of a data storage and retrieval apparatus in accordance with the present invention.

FIG. 9 shows the thin film read head of the present invention embodied in a disk type magnetic data storage and retrieval apparatus 300. The write head of the present invention is located within a merged head assembly 320 which rides above a magnetic storage media 310, depicted in FIG. 1 as a rotatable hard disk type storage media. The hard disk 310 is coupled to a motor 340 to provide rotation of the disk relative to the head assembly 320. An actuating means 330 may be used to position the head assembly 320 above the surface of the media 310 to read and write data in the form of magnetic bits from and to the media 310. The data storage and retrieval apparatus 300, typically has several hard disks 310 and several corresponding head assemblies 320.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film read head comprising:
    a lower shield layer including
        a lower portion, and
        a lower pedestal portion above the lower portion and having two sidewalls terminating at an air bearing surface;
    a sensor element disposed above the lower pedestal portion;
    a first insulating gap layer disposed between the sensor element and the lower pedestal portion and including planar upper and lower surfaces; and
    a first inset extra gap layer disposed between the first insulating gap layer and the lower portion of the lower shield layer and contiguous with both sidewalls.

2. The thin film read head of claim 1 wherein a top surface of the first inset extra gap layer is approximately level with a top surface of the pedestal portion.

3. The thin film read head of claim 1 wherein the first inset extra gap layer includes Al$_2$O$_3$.

4. The thin film read head of claim 3 wherein the first inset extra gap layer has a thickness of approximately 500 Å to 5000 Å.

5. The thin film read head of claim 1 further comprising an upper shield layer including an upper pedestal portion disposed above the sensor element.

6. The thin film read head of claim 5 further comprising a second insulating gap layer disposed between the sensor element and the upper pedestal portion.

7. The thin film read head of claim 6 further comprising a second inset extra gap layer disposed to either side of the upper pedestal portion and between the second insulating gap layer and the upper shield layer.

8. The thin film read head of claim 7 further comprising first and second leads contacting the sensor element.

9. The thin film read head of claim 1 being capable of writing a track of data with a trackwidth less than 1 micron.

10. The thin film read head of claim 9 wherein the trackwidth is less than 0.3 micron.

11. The thin film read head of claim 1 wherein a plane bisecting the sensor element intersects the lower pedestal portion.

12. The thin film read head of claim 1 wherein the two sidewalls are parallel.

13. A thin film read head comprising:
    a lower shield layer including
        a lower portion, and
        a lower pedestal portion disposed above the lower portion and having two sidewalls terminating at an air bearing surface;
    a sensor element disposed directly on top of the lower pedestal portion;
    a first insulating gap layer disposed between the sensor element and the lower pedestal portion; and
    a first inset extra gap layer disposed on both sides of the lower pedestal portion and between the first insulating gap layer and the lower shield layer.

14. The thin film read head of claim 13 further comprising an upper shield layer disposed above the sensor element.

15. The thin film read head of claim 14 wherein the upper shield layer includes an upper pedestal portion.

16. The thin film read head of claim 15 wherein the upper pedestal portion is aligned with the lower pedestal portion.

17. The thin film read head of claim 15 further comprising a second insulating gap layer disposed between the sensor element and the upper pedestal portion.

18. The thin film read head of claim 17 further comprising a second inset extra gap layer disposed between the second insulating gap layer and the upper shield layer.

19. The thin film read head of claim 18 wherein the second inset extra gap layer is disposed on both sides of the upper pedestal portion.

20. The thin film read head of claim 14 wherein the upper and lower shields include NiFe.

21. The thin film read head of claim 13 wherein the sensor element has a width less than a width of the lower pedestal portion.

22. The thin film read head of claim 13 further including first and second leads electrically coupled to the sensor element.

23. The thin film read head of claim 22 wherein the first and second leads are disposed on opposing sides of the sensor element.

24. The thin film read head of claim 13 wherein the first inset extra gap layer has of thickness of approximately 500 Å to 5000 Å.

25. The thin film read head of claim 13 wherein the first inset extra gap layer includes alumina.

26. The thin film read head of claim 13 wherein the lower pedestal portion includes a top surface that is substantially coplanar with a top surface of the inset extra gap layer.

27. The thin film read head of claim 13 wherein the sensor element includes a spin valve.

28. A thin film read head comprising:
    a lower shield layer including
        a top surface extending to an air bearing surface and defining a plane, and
        a lower pedestal portion above the plane and extending to the air bearing surface;
    a sensor element disposed above the lower pedestal portion;
    a first insulating gap layer disposed between the sensor element and the lower pedestal portion and including planar upper and lower surfaces; and
    a first inset extra gap layer disposed to both sides of the lower pedestal portion and between the first insulating gap layer and the lower shield layer.

29. A thin film read head comprising:
    a lower shield layer including
        a lower portion having a first width at an air bearing surface, and
        a lower pedestal portion above the lower portion and having a second width at an air bearing surface less than the first width;
    a sensor element disposed above the lower pedestal portion;

a first insulating gap layer disposed between the sensor element and the lower pedestal portion; and a first inset extra gap layer disposed to both sides of the lower pedestal portion and between the first insulating gap layer and the lower shield layer.

30. A thin film read head comprising:

a lower shield layer including a lower portion, and a lower pedestal portion above the lower portion and having a long axis perpendicular to an air bearing surface;

a sensor element disposed above the lower pedestal portion;

a first insulating gap layer disposed between the sensor element and the lower pedestal portion and including planar upper and lower surfaces; and a first inset extra gap layer disposed to both sides of the lower pedestal portion and between the first insulating gap layer and the lower shield layer.

* * * * *